United States Patent
Amaru et al.

(10) Patent No.: US 9,435,904 B2
(45) Date of Patent: Sep. 6, 2016

(54) METHOD OF CORRECTING VELOCITY FOR COMPLEX SURFACE TOPOGRAPHY

(71) Applicants: Maisha Lara Amaru, Houston, TX (US); Cory James Hoelting, Houston, TX (US)

(72) Inventors: Maisha Lara Amaru, Houston, TX (US); Cory James Hoelting, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 439 days.

(21) Appl. No.: 14/134,258

(22) Filed: Dec. 19, 2013

(65) Prior Publication Data

US 2015/0177401 A1 Jun. 25, 2015

(51) Int. Cl.
| | | |
|---|---|---|
| *G01V 1/00* | (2006.01) | |
| *G01V 1/36* | (2006.01) | |
| *G01V 1/28* | (2006.01) | |
| *G01V 1/30* | (2006.01) | |
| *G01V 99/00* | (2009.01) | |

(52) U.S. Cl.
CPC .............. *G01V 1/36* (2013.01); *G01V 1/282* (2013.01); *G01V 1/303* (2013.01); *G01V 99/005* (2013.01); *G01V 2210/622* (2013.01); *G01V 2210/66* (2013.01); *G01V 2210/661* (2013.01)

(58) Field of Classification Search
CPC .......... G01V 2210/6248; G01V 1/32; G01V 1/284; G01V 1/30; G01V 1/306; G01V 1/50; G01V 15/00; G01V 1/282; G01V 1/303; G01V 1/36; G01V 2210/622; G01V 2210/647; G01V 2210/66; G01V 2210/661
See application file for complete search history.

(56) References Cited

U.S. PATENT DOCUMENTS

| | | | |
|---|---|---|---|
| 2004/0172199 A1 | 9/2004 | Chavarria et al. | |
| 2010/0195440 A1* | 8/2010 | Bjerkholt ................ | G01V 1/50 367/73 |
| 2011/0139462 A1 | 6/2011 | Bourne | |

FOREIGN PATENT DOCUMENTS

| | | |
|---|---|---|
| CN | 102707318 A | 10/2012 |
| CN | 102749649 A | 10/2012 |
| WO | 2008/087174 | 7/2008 |

OTHER PUBLICATIONS

Roste, Monitoring overburden and reservoir changes from prestack time-lapse seismic data—application to chalk fields, Trondheim, Mar. 2007.*

Holt, Rune M., et al.; "In-Situ Stress Dependence of Wave Velocities in Reservoir and Overburden Rocks"; The Leading Edge, Dec. 2005, pp. 1268-1274.

(Continued)

*Primary Examiner* — Roy Y Yi
(74) *Attorney, Agent, or Firm* — Albert K. Shung; Marie L. Clapp

(57) ABSTRACT

Embodiments of a method for correcting velocity models for complex topographies are disclosed herein. In general, embodiments of the method utilize velocity corrections based on geomechanical effects to correct a velocity model to take into account complex surface topographies. In particular, embodiments of the method use a nucleus strain theory to determine the velocity corrections. Further details and advantages of various embodiments of the method are described in more detail herein.

18 Claims, 5 Drawing Sheets

(56) References Cited

OTHER PUBLICATIONS

Jarosinski, M., et al..; "Redistribution of Recent Collision Push and Ridge Push in Central Europe: Insights from FEM Modelling"; 2006, Geophysics. J. Int., vol. 167, pp. 860-880.

Korneev, Valeri, at al.; "Seismic Velocity Changes Cause by an Overburden Stress"; 2013, Geophysics, vol. 78, No. 5, pp. WC25-WC31.

MacBeth, Colin; Edinburgh Time-Lapse Project Phase IV, Oct. 17, 2008, Version 2.2, Reservoir Geophysics Group, Institute of Petroleum Engineering, Heriot-Watt University, Edinburgh, pp. 1-36.

Mindlin, Raymond D., et al.; "Nuclei of Strain in the Semi-Infinite Solid"; Jan. 1950, Journal of Applied Physics, vol. 21, No. 9, pp. 926-930.

International Search Report, issued on Feb. 27, 2015, during the prosecution of International Application No. PCT/US2014/060050.

Written Opinion of the International Searching Authority, issued on Feb. 27, 2015, during the prosecution of International Application No. PCT/US2014/060050.

Birdus, S., et al.; "Combination of Geomechanical Modelling and Tomography to Resolve Severe Velocity Variations Below Rugose Seafloor"; 74th EAGE Conference & Exhibition incorporating SPE EUROPEC 2012, Jun. 4-7, 2012; W003.

Birdus, S.; "Geomechanical Modeling to Resolve Velocity Anomalies and Image Distortions below Seafloor with Complex Topography"; 71st EAGE Conference & Exhibition—Amsterdam, The Netherlands, Jun. 8-11, 2009; U014.

Birdus, S.; "Restoring Velocity Variations Below Seafloor with Complex Topography by Geomechanical Modeling"; SEG Las Vegas 2008 Annual Meeting; pp. 3310-3314.

Debenham, Helen, et al.; "Pre-Stack Depth Migration for Improved Imaging Under Seafloor Canyons: 2D Case Study of Browse Basin, Australia"; CSIRO Publishing, Exploration Geophysics; 2013; pp. A-G.

Debenham, Helen, et al.; "PSDM for Improved Imaging Under Seafloor Channels—Browse Basin, Australia Case Study"; 22nd ASEG Conference & Exhibition, Feb. 26-29, 2012; pp. 1-4.

Eaton, Ben A.; "The Equation for Geopressure Prediction from Well Logs"; SPE 5544; 50th Annual Fall Meeting of the Society of Petroleum Engineers of AIME, Sep. 28-Oct. 1, 1975, pp. 1-5 (with attachments).

Gardner, G.H.F., et al.; "Formation Velocity and Density—The Diagnostic Basics for Stratigraphic Traps"; Geophysics, vol. 39, No. 6, Dec. 1974, pp. 770-780.

Geertsma, J.; "Land Subsidence Above Compacting Oil and Gas Reservoirs"; Journal of Petroleum Technology, Jun. 1973, #3730, pp. 734-744.

Jones, Ian F.; "Tutorial: Incorporating Near-Surface Velocity Anomalies in Pre-Stack Depth Migration Models"; First Break, vol. 30, Mar. 2012, Technical Article, pp. 47-58.

PCT International Search Report and Written Opinion, International App. No. PCT/US2014/060050, Jun. 30, 2016.

* cited by examiner

METHOD OF CORRECTING VELOCITY FOR COMPLEX SURFACE TOPOGRAPHY

CROSS-REFERENCE TO RELATED APPLICATIONS

Not applicable.

STATEMENT REGARDING FEDERALLY SPONSORED RESEARCH OR DEVELOPMENT

Not applicable

BACKGROUND

1. Field of the Invention

This invention relates generally to the field of geophysical exploration for hydrocarbons. More specifically, the invention relates to a method of velocity correction in seismic processing and imaging.

2. Background of the Invention

A seismic survey is a method of imaging the subsurface of the earth by delivering acoustic energy down into the subsurface and recording the signals reflected from the different rock layers below. The source of the acoustic energy typically comes from a seismic source such as without limitation, explosions or seismic vibrators on land, and air guns in marine environments. During a seismic survey, the seismic source may be moved across the surface of the earth above the geologic structure of interest. Each time a source is detonated or activated, it generates a seismic signal that travels downward through the earth, is reflected, and, upon its return, is recorded at different locations on the surface by receivers. The recordings or traces are then combined to create a profile of the subsurface that can extend for many miles. In a two-dimensional (2D) seismic survey, the receivers are generally laid out along a single straight line, whereas in a three-dimensional (3D) survey the receivers are distributed across the surface in a grid pattern. A 2D seismic line provides a cross sectional picture (vertical slice) of the earth layers as arranged directly beneath the recording locations. A 3D survey produces a data "cube" or volume that theoretically represents a 3D picture of the subsurface that lies beneath the survey area.

In the oil and gas industry, the primary goal of seismic exploration is locating subterranean features of interest within a very large seismic volume. Rock stratigraphic information may be derived through the analysis of spatial variations in a seismic reflector's character because these variations may be empirically correlated with changes in reservoir lithology or fluid content. Since the exact geological basis behind these variations may not be well understood, a common method is to calculate a variety of attributes from the recorded seismic data and then plot or map them, looking for an attribute that has some predictive value. Given the extremely large amount of data collected in a 3-D volume, methods of enhancing the appearance of subsurface features related to the migration, accumulation, and presence of hydrocarbons are extremely valuable in seismic exploration.

In geological areas where the topography of the seafloor is highly complex or rugose (e.g. seafloor canyons, seamounts, and/or valleys), the seismic velocity model that is derived from conventional velocity estimation often cannot fully account for velocity changes related to the topography. Consequently, there is a need for methods and systems for correcting velocity in the field of seismic processing and interpretation in areas of complex topography.

BRIEF SUMMARY

Embodiments of a method for correcting velocity models for complex topographies are disclosed herein. In general, embodiments of the method utilize velocity corrections based on geomechanical effects to correct an initial velocity model to take into account complex surface topographies. In particular, embodiments of the method use a nucleus strain theory to determine the velocity corrections. Further details and advantages of various embodiments of the method are described in more detail below.

In an embodiment, a computer-implemented method of correcting a velocity model comprise: (a) selecting a velocity model of a subsurface region of interest, the subsurface region of interest located proximate a surface comprising one or more topographic anomalies. The method further comprises (b) determining an anomalous overburden stress caused by the one or more topographic anomalies. In addition, the method comprises (c) determining an overburden strain caused by the one or more topographic anomalies. The method also comprises (d) using a nucleus of strain theory to determine an anomalous stress propagation in the subsurface region of interest. Moreover, the method comprises (e) determining a velocity correction factor from the anomalous stress propagation and (f) using the velocity correction factor to generate a corrected velocity model, wherein at least one of (a) through (f) is performed on a computer In another embodiment, a computer system comprises an interface for receiving a seismic input volume, the seismic input volume comprising a plurality of seismic traces. The computer system also comprises a memory resource. In addition, the computer system comprises input and output functions for presenting and receiving communication signals to and from a human user. The computer system also comprises one or more central processing units for executing program instructions and program memory coupled to the central processing unit for storing a computer program including program instructions that when executed by the one or more central processing units, causes the computer system to perform a plurality of operations for correcting a velocity model. The plurality of operations comprises: (a) selecting a velocity model of a subsurface region of interest, the subsurface region of interest located proximate a surface comprising one or more topographic anomalies. The plurality of operations also comprises (b) determining an anomalous overburden stress caused by the one or more topographic anomalies. The plurality of operations further comprises (c) determining an overburden strain caused by the one or more topographic anomalies. The plurality of operations additionally comprises (d) using a nucleus of strain theory to determine an anomalous stress propagation in the subsurface region of interest. Moreover, the plurality of operations comprises (e) determining a velocity correction factor from the anomalous stress propagation and (f) using the velocity correction factor to generate a corrected velocity model.

In another embodiment, computer-implemented method of correcting a velocity model, comprises: (a) selecting a velocity model of a subsurface region of interest, the subsurface region of interest located proximate a surface comprising one or more topographic anomalies. In addition, the method comprises (b) using a nucleus of strain theory to determine a velocity correction factor for the one or more topographic anomalies and (c) using the velocity correction factor to generate a corrected velocity model, wherein at least one of (a) through (c) is performed on a computer.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
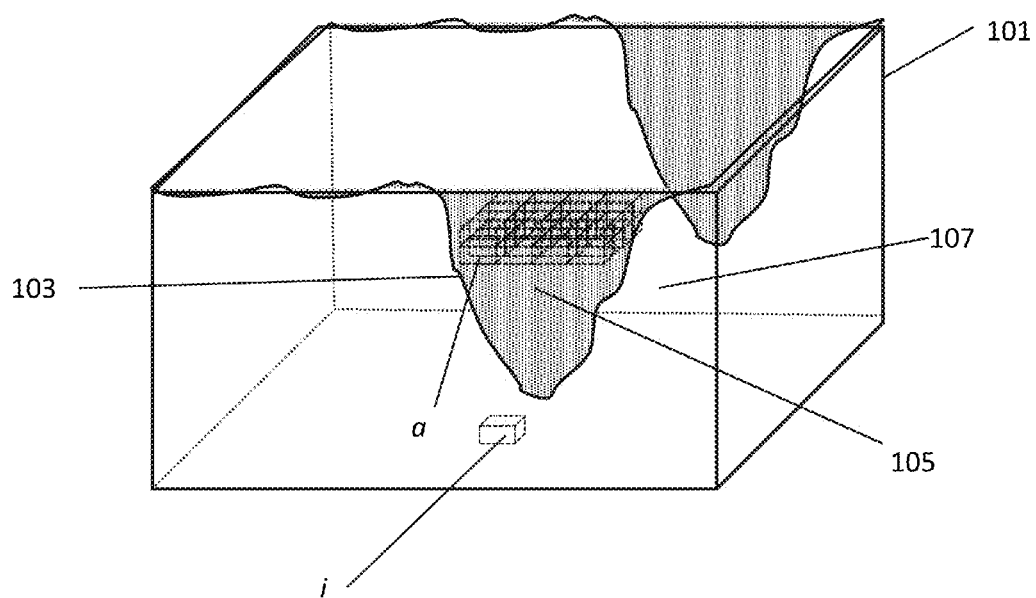
FIG. 1 illustrates a 3D schematic representation of a selected subsurface region of interest having complex surface topography.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

As used herein, "pre-stack depth migration (PSDM)" refers to depth migration operation prior to a stacking operation as is known in the art.

As used herein, "horizontal stack" or "horizontal stacking" refers to an operation on a set of traces which sums all the amplitudes at the same time or depth point.

As used herein, "seismic trace" refers to the recorded data from a single seismic recorder or seismograph and typically plotted as a function of time or depth.

DETAILED DESCRIPTION OF THE PREFERRED EMBODIMENTS

Referring now to the Figures, embodiments of the disclosed methods will be described. As a threshold matter, embodiments of the methods may be implemented in numerous ways, as will be described in more detail below, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the disclosed methods are discussed below. The appended drawings illustrate only typical embodiments of the disclosed methods and therefore are not to be considered limiting of its scope and breadth.

Embodiments of the disclosed methods assume a plurality of seismic traces have been acquired as a result of a seismic survey using any methods known to those of skill in the art. A seismic survey may be conducted over a particular geographic region whether it be in an onshore or offshore context. A survey may be a three dimensional (3D) or a two dimensional (2D) survey. The raw data collected from a seismic survey are unstacked (i.e., unsummed) seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The goal of a seismic survey is to acquire a set of seismic traces over a subsurface target of some potential economic importance. Data that are suitable for analysis by the methods disclosed herein might consist of, for purposes of illustration only, a 2-D stacked seismic line extracted from a 3-D seismic survey or, a 3-D portion of a 3-D seismic survey. However, it is contemplated that any 3-D volume of seismic data might potentially be processed to advantage by the methods disclosed herein. After the seismic data are acquired, they are typically brought back to the processing center where some initial or preparatory processing steps are applied to them.

The methods disclosed herein may be applied at the data processing stage, the general object of the disclosed methods being to use the seismic input volume 201 to produce a "seismic output cube" which can then be utilized by the interpreter in his or her quest for subterranean exploration formations. Standard seismic tomography methods include forward modeling to match synthetic data computed from an earth or subsurface model to real recorded data. This match is achieved by making incremental changes to the earth model to find the velocity model that minimizes the mismatch between the reflection-event traveltimes of modeled and recorded data.

Figure 2:
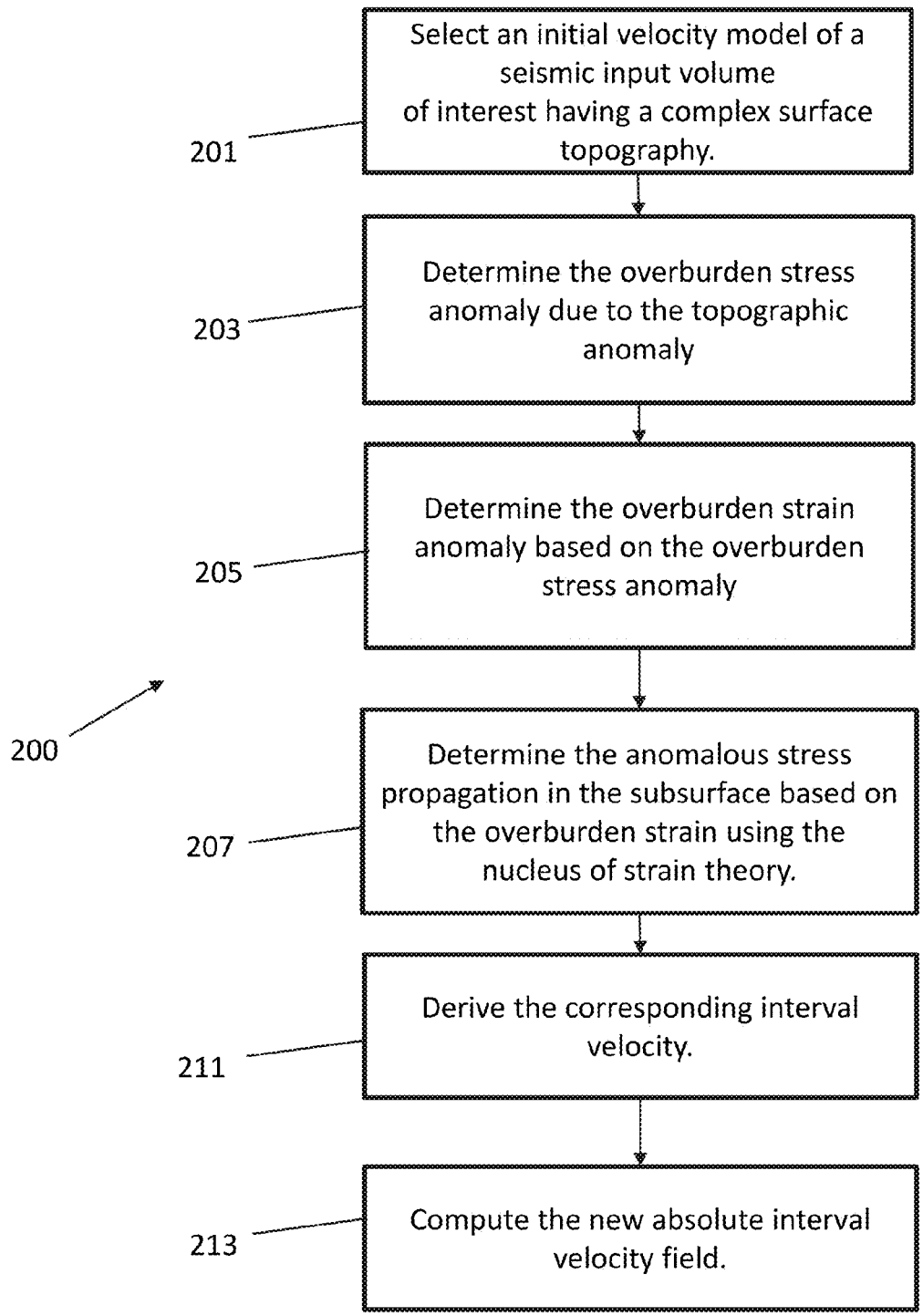
FIG. 2 illustrates an embodiment of a method for correcting a velocity model for complex surface topography.

FIGS. 1 and 2 illustrate visually an embodiment of a method 200 and FIG. 2 includes a flow chart that illustrates an embodiment of the disclosed method, wherein a seismic velocity model is corrected in view of complex seafloor topography. Referring to FIG. 1, a subsurface volume or region of interest 101 having a complex surface topography or one or more topographic anomalies 103 may be selected. In an embodiment, the complex surface topography or topographic anomalies 103 are located on the seafloor. As used herein, complex surface topography may refer to one or more rugose geological surface features such as without limitation, a seamount, a ridge, a valley, or a sea canyon. The subsurface region 101 may be a three dimensional volume of interest. Although embodiments of the method 200 will be described with respect to three dimensional volume of interest, it is contemplated that embodiments of the method may be applied to two dimensional regions of interest.

Referring to FIG. 2, in 201, an initial or pre-existing seismic velocity model of the subsurface regions or areas 101 of interest may be selected which has been previously generated through methods well known to those of skill in the art. Generally, as known to those of skill in the art, velocity models are discretized into sub-regions or "cells" labeled "a" or "i" in FIG. 1. The solid subsurface region 101 can be described as a continuous or discrete medium, of which the discretized one is often parameterized in grids (or cells). A commonly used grid parameterization is a rectangular grid (cubic in 3D) with velocities defined at the grid nodes. However, it is contemplated that any geometries (e.g. cubic, rectangular, polyhedrons, etc.) may be used to define the subsurface region of interest 101. Likewise, any suitable geometries may be used to define the cells. The cells may also be of any suitable size. As will be described further below, a represents cells in the anomalous topographic region 105 while cells, i, are located proximate the topographic anomaly 103. The cells shown are only illustrative in purpose. That is, although only one cell, i, is depicted and small group of cells, a, are depicted, it should be understood that the entire subsurface region including any in a topographic anomaly would be discretized into many cells. In addition, the variables $r_a$ and $r_i$ indicate the respective positions of individual cells, a and i, within the region of interest 101.

Without being limited by theory, the general principle behind embodiments of the method 200 is that the compaction of young shallow sediments is affected by the rugose features that create the complex surface topography, and this introduces laterally varying geomechanical stresses, which are reflected in the rock properties, including the interval velocities. This effect may be approximated by introducing a velocity perturbation related to the surface topography, (i.e. "near surface correction"). The velocity perturbation may be propagated vertically and laterally away from the local topographic variation, and the precise values of the velocity perturbation can be selected through a trial and error process. For example, PSDM gathers may then be used to indicate the accuracy of each perturbation of the model.

In an embodiment, now referring to FIG. 2, the anomalous overburden stress due to the local topographic variation may be calculated or determined at a subsurface region of interest in 203. More particularly, the overburden stress may be calculated using the following equation:

$$dS_0(z_i) = \sum_i (\rho_{flat} - \rho_{orig})g(z_i - z_{i-1}) \quad \text{Equation (1)}$$

where $dS_0$=the anomalous overburden stress, $\rho_{flat}$=density without the topography, $\rho_{orig}$=original density, g=the gravitational constant, $z_i$=depth. As an example, in the case where the complex topography represents a sea canyon or valley (as shown in FIG. 1), $\rho_{flat}$ may be a sediment density equivalent to sediments or rocks in the subsurface region of interest. The sediments selected may be based on local knowledge of the region of interest or through trial and error. This $\rho_{flat}$ value may be calculated with Gardner's equation. See e.g., Gardner, G. H. F.; Gardner L. W. & Gregory A. R. (1974), "Formation velocity and density—the diagnostic basics for stratigraphic traps". Geophysics 39: 770-780, incorporated herein by reference for all purposes.

Using the anomalous overburden stress determined in equation 1, the corresponding overburden strain may then be determined or calculated in 205. More particularly, in an embodiment, the overburden strain may be determined using the following equation:

$$E_0(\vec{r}_a) = dS_0(r_a)\frac{(1+v)(1-2v)}{E(1-v)} \quad \text{Equation (2)}$$

where $E_0$=anomalous overburden strain, $dS_0$=the anomalous overburden stress, E=Young's modulus of a sediment, v=Poisson's ratio of a sediment, $r_a$=location of a subsurface cell in the anomalous region (e.g. canyon, valley, seamount, etc.). E represents the Young's modulus of representative sediments or rocks in the surrounding subsurface region of interest. Examples of sediment properties include properties of sand, mud, etc.

In an embodiment, the resulting anomalous stress effect on the subsurface may be calculated using the "nucleus of strain" theory as described in Geertsma, J., Land Subsidence Above Compacting Oil and Gas Reservoirs, Journal of Petroleum Technology, Vol. 25, No. 6., 1973, which is incorporated herein by reference for all purposes. The nucleus of strain concept can be used to provide the displacement field and therefore strain around a volume of anomalous stress. The exact formulation of the equation will depend on the boundary conditions. Without imposing any surface boundary conditions, the vertical stress effect in a subsurface cell caused by the overburden anomaly of a cell in the topographically anomalous area may be computed as $$S_z(r_{a,i}) = -\frac{C_m}{R^3} \quad \text{Equation (3)}$$

Where $S_z$=anomalous stress at a location ($r_i$) in the subsurface, R=distance between the subsurface cell "i" and a cell "a" in the anomalous area, where $$C_m = \frac{2GV_aE_0(r_a)}{4\pi} \quad \text{Equation (4)}$$

where G=shear modulus, $V_a$=volume of the anomalous cell, $E_0(r_a)$ as defined in Equation 2. The anomalous stress effect at the location of each subsurface cell, i, may then be computed by summing over the effect of all anomalous cells, a:

$$S_{zz}(r_i) = \sum_{a \in anomaly} S_z(r_{a,i}) \quad \text{Equation (5)}$$

$S_{zz}$=anomalous stress, $S_z(r_{a,i})$=as defined in Equation (3), and $r_i$=a location or cell in the subsurface proximate the topographic anomaly 103 as shown in FIG. 1.

In an embodiment, the corresponding interval velocity anomaly may then be determined by using the inverse of Eaton's method as described in Eaton, B. E., The Equation for Geopressure Prediction from Well Logs, SPE 5544, 1975, which is incorporated herein by reference for all purposes:

$$vint_{anom} = vint_{orig}\left[\left(1 + \frac{S_{zz}}{S_0}\right)^{\frac{1}{n}} - 1\right] \quad \text{Equation (6)}$$

where $vint_{anom}$=interval velocity anomaly, $vint_{orig}$=original interval velocity, $S_0$=the overburden stress, $S_{zz}$=anomalous stress as determined from equation (5), and n=an exponent that describes the sensitivity of velocity to stress. In an embodiment, n may equal 3.

The new corrected absolute velocity field may then be computed as follows:

$$vint_{corrected} = vint_{original} + vint_{anom} \quad \text{Equation (7)}$$

where $vint_{anom}$=interval velocity perturbation due to the overburden correction, $vint_{orig}$=original interval velocity, $vint_{corrected}$=interval velocity after applying the interval velocity correction.

Those skilled in the art will appreciate that the disclosed methods may be practiced using any one or combination of hardware and software configurations, including but not limited to a system having single and/or multi-processer computer processors system, hand-held devices, programmable consumer electronics, mini-computers, mainframe computers, supercomputers, and the like. The disclosed methods may also be practiced in distributed computing environments where tasks are performed by servers or other processing devices that are linked through one or more data communications networks. In a distributed computing environment, program modules may be located in both local and remote computer storage media including memory storage devices.

Figure 3:
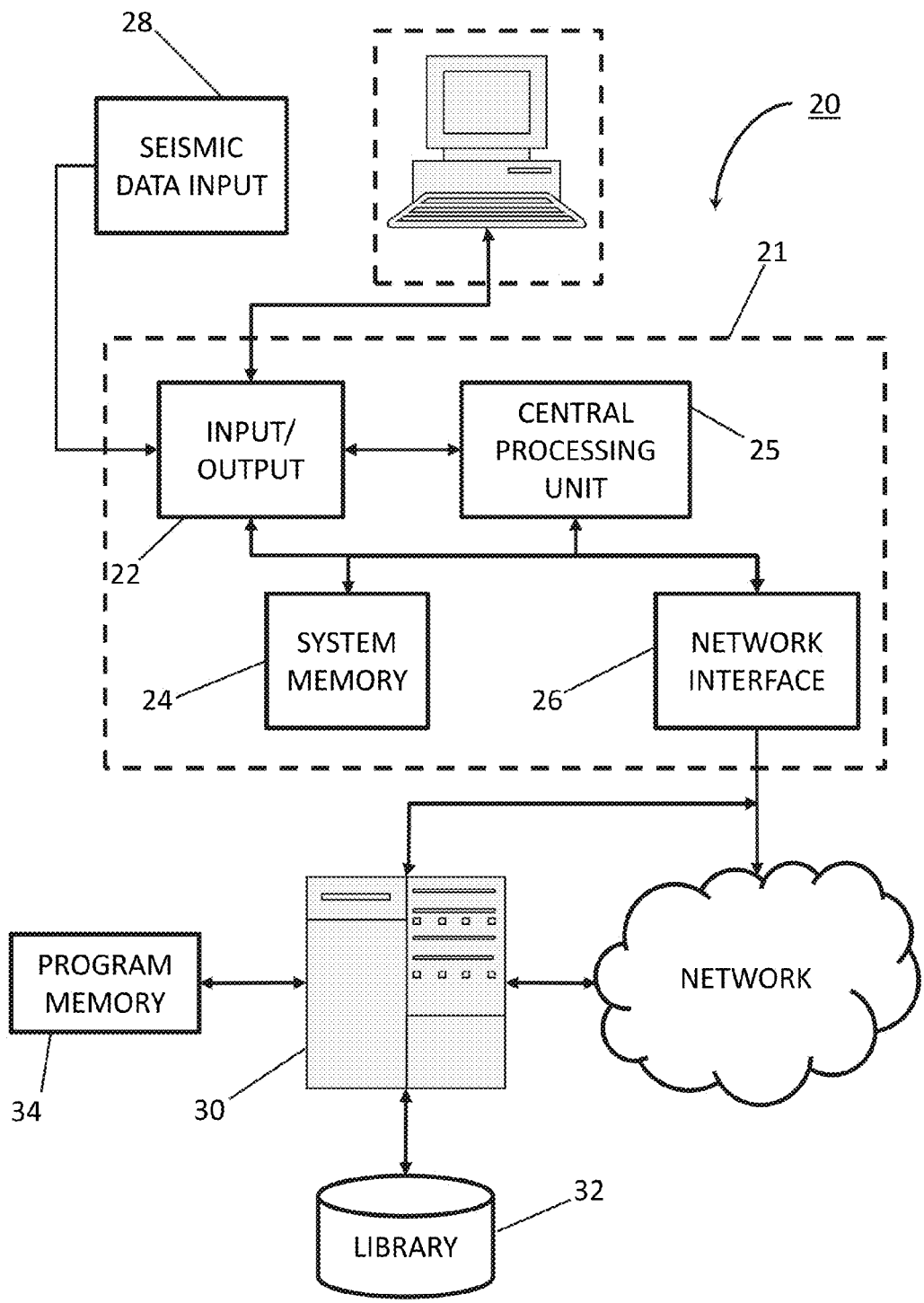
FIG. 3 a schematic of a system which may be used in conjunction with embodiments of the disclosed methods.

FIG. 3 illustrates, according to an example of an embodiment computer system 20, which may perform the velocity model correction operations described in this specification. In this example, system 20 is as realized by way of a computer system including workstation 21 connected to server 30 by way of a network. Of course, the particular architecture and construction of a computer system useful in connection with this invention can vary widely. For example, system 20 may be realized by a single physical computer, such as a conventional workstation or personal computer, or alternatively by a computer system implemented in a distributed manner over multiple physical computers. Accordingly, the generalized architecture illustrated in FIG. 3 is provided merely by way of example.

As shown in FIG. 3 and as mentioned above, system 20 may include workstation 21 and server 30. Workstation 21 includes central processing unit 25, coupled to system bus. Also coupled to system bus is input/output interface 22, which refers to those interface resources by way of which peripheral functions P (e.g., keyboard, mouse, display, etc.) interface with the other constituents of workstation 21. Central processing unit 25 refers to the data processing capability of workstation 21, and as such may be implemented by one or more CPU cores, co-processing circuitry, and the like. The particular construction and capability of central processing unit 25 is selected according to the application needs of workstation 21, such needs including, at a minimum, the carrying out of the functions described in this specification, and also including such other functions as may be executed by computer system. In the architecture of allocation system 20 according to this example, system memory 24 is coupled to system bus BUS, and provides memory resources of the desired type useful as data memory for storing input data and the results of processing executed by central processing unit 25, as well as program memory for storing the computer instructions to be executed by central processing unit 25 in carrying out those functions. Of course, this memory arrangement is only an example, it being understood that system memory 24 may implement such data memory and program memory in separate physical memory resources, or distributed in whole or in part outside of workstation 21. In addition, as shown in FIG. 3, seismic data inputs 28 that are acquired from a seismic survey are input via input/output function 22, and stored in a memory resource accessible to workstation 21, either locally or via network interface 26.

Network interface 26 of workstation 21 is a conventional interface or adapter by way of which workstation 21 accesses network resources on a network. As shown in FIG. 3, the network resources to which workstation 21 has access via network interface 26 includes server 30, which resides on a local area network, or a wide-area network such as an intranet, a virtual private network, or over the Internet, and which is accessible to workstation 21 by way of one of those network arrangements and by corresponding wired or wireless (or both) communication facilities. In this embodiment of the invention, server 30 is a computer system, of a conventional architecture similar, in a general sense, to that of workstation 21, and as such includes one or more central processing units, system buses, and memory resources, network interface functions, and the like. According to this embodiment of the invention, server 30 is coupled to program memory 34, which is a computer-readable medium that stores executable computer program instructions, according to which the operations described in this specification are carried out by allocation system 30. In this embodiment of the invention, these computer program instructions are executed by server 30, for example in the form of a "web-based" application, upon input data communicated from workstation 21, to create output data and results that are communicated to workstation 21 for display or output by peripherals P in a form useful to the human user of workstation 21. In addition, library 32 is also available to server 30 (and perhaps workstation 21 over the local area or wide area network), and stores such archival or reference information as may be useful in allocation system 20. Library 32 may reside on another local area network, or alternatively be accessible via the Internet or some other wide area network. It is contemplated that library 32 may also be accessible to other associated computers in the overall network.

The particular memory resource or location at which the measurements, library 32, and program memory 34 physically reside can be implemented in various locations accessible to allocation system 20. For example, these data and program instructions may be stored in local memory resources within workstation 21, within server 30, or in network-accessible memory resources to these functions. In addition, each of these data and program memory resources can itself be distributed among multiple locations. It is contemplated that those skilled in the art will be readily able to implement the storage and retrieval of the applicable measurements, models, and other information useful in connection with this embodiment of the invention, in a suitable manner for each particular application.

According to this embodiment, by way of example, system memory 24 and program memory 34 store computer instructions executable by central processing unit 25 and server 30, respectively, to carry out the disclosed operations described in this specification, for example, by way of which the velocity model may be corrected for complex topographies. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. Such computer-executable instructions may include programs, routines, objects, components, data structures, and computer software technologies that can be used to perform particular tasks and process abstract data types. It will be appreciated that the scope and underlying principles of the disclosed methods are not limited to any particular computer software technology. For example, an executable web-based application can reside at program memory 34, accessible to server 30 and client computer systems such as workstation 21, receive inputs from the client system in the form of a spreadsheet, execute algorithm modules at a web server, and provide output to the client system in some convenient display or printed form. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by allocation system 20 in the conventional manner for software installation.

EXAMPLE

Figure 4A:
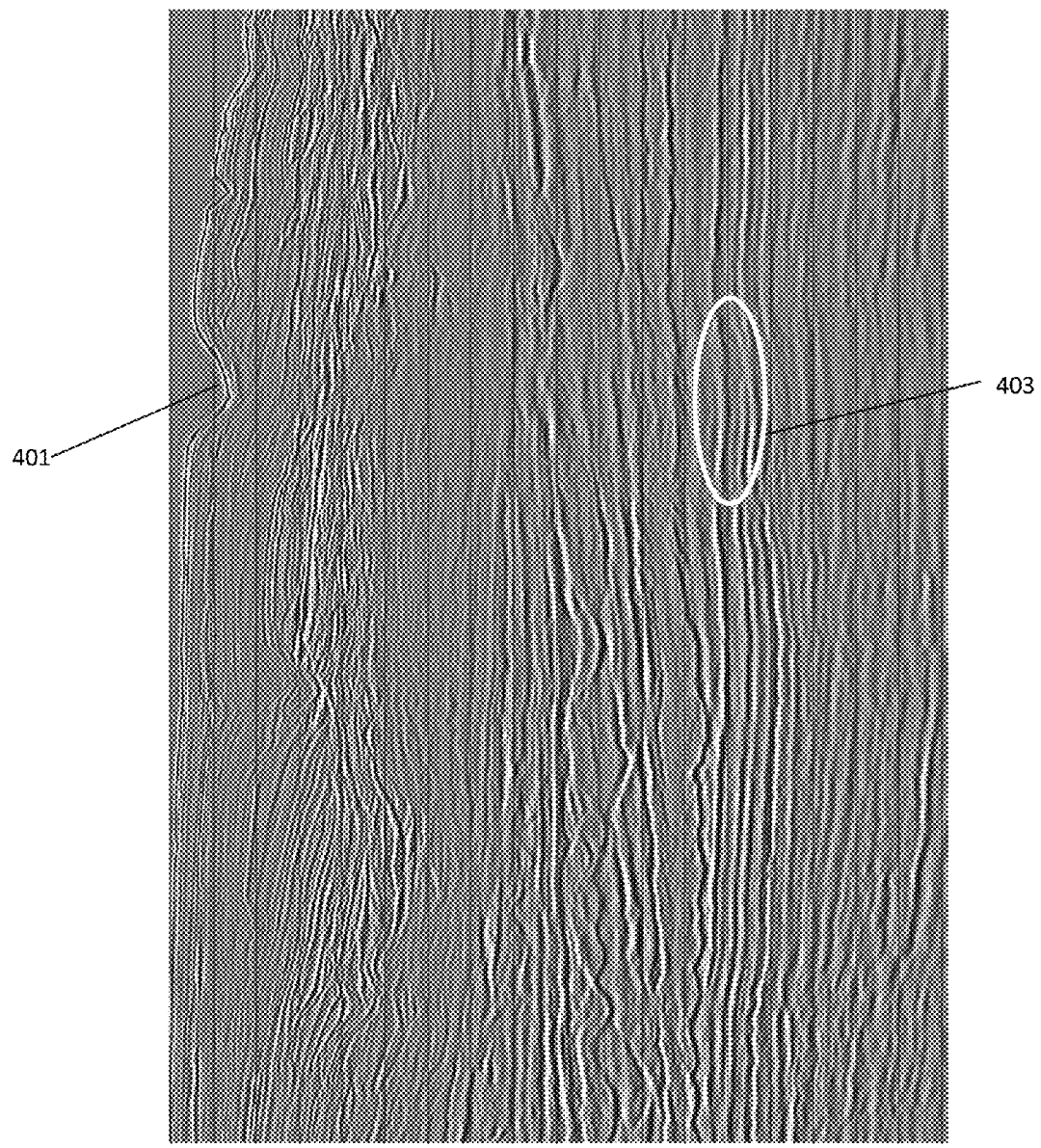
FIG. 4A shows a seismic section with complex topography prior to application of an embodiment of the disclosed method.
Figure 4B:
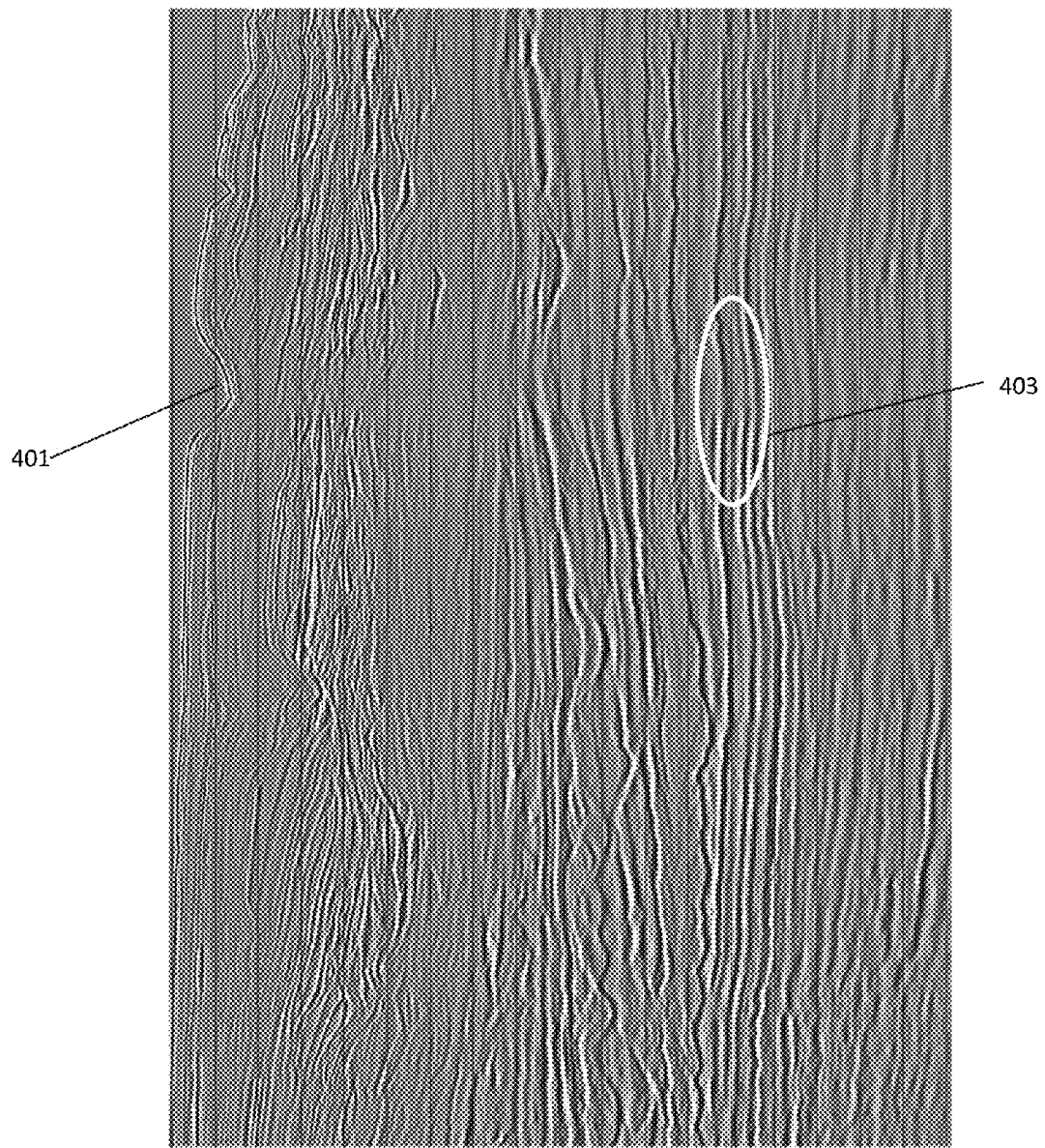
FIG. 4B shows a seismic section with complex topography after application of an embodiment of the disclosed method.

Referring now to FIGS. 4A and 4B, the results after applying an embodiment of the method for correcting a velocity model are shown. The seismic vertical section in FIG. 4A shown is prior to enhancement or correction with the disclosed method. A surface topographical feature or topographic anomaly (i.e. canyon) 401 can be seen. The white oval encircles certain subsurface features. The seismic vertical section in FIG. 4B is shown after enhancement or correction by the disclosed method. The encircled feature 403 clearly shows an improved image with more continuous reflections after applying the velocity correction.

While the embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A computer-implemented method of correcting a velocity model, the method comprising:
   (a) selecting a velocity model of a subsurface region of interest, the subsurface region of interest located proximate to a surface comprising one or more topographic anomalies;
   (b) determining an anomalous overburden stress caused by the one or more topographic anomalies;
   (c) determining an overburden strain caused by the one or more topographic anomalies;
   (d) using a nucleus of strain theory to determine an anomalous stress propagation in the subsurface region of interest by calculating $$S_z(r_{a,i}) = -\frac{C_m}{R^3}$$

$S_z(r_{a,i}) = -C_m/R^3$ wherein $S_z(r_{a,i})$=anomalous stress at a particular subsurface location $r_i$ caused by cell "a" in the anomalous topography, R=distance between subsurface cell "i" and a cell "a" in the one or more topographic anomalies with $$C_m = \frac{2GV_a E_0(r_a)}{4\pi}$$

$C_m = 2G\, V_a E_0\, (r_a)/4\pi$ where G=shear modulus, $V_a$=volume of a cell in the one or more topographic anomalies, $E_0(r_a)$=anomalous overburden strain at location $r_a$;
   (e) determining a velocity correction factor from the anomalous stress propagation; and
   (f) using the velocity correction factor to generate a corrected velocity model, wherein at least one of (a) through (f) is performed on a computer.

2. The method of claim 1 wherein the one or more topographic anomalies comprises a seamount, a ridge, a canyon, a valley, or combinations thereof.

3. The method of claim 1 wherein (b) comprises determining the overburden stress using:

$$dS_0(z_i) = \sum_i (\rho_{flat} - \rho_{orig}) g(z_i - z_{i-1})$$

where $dS_0$=the anomalous overburden stress, $\rho_{flat}$=the density without the one or more topographic anomalies, $\rho_{orig}$=original density, g=gravitational constant, and $z_i$=depth.

4. The method of claim 3 wherein the density is calculated using Gardner's equation.

5. The method of claim 1 wherein (c) comprises determining the overburden strain using:

$$E_0(r_a) = dS_0(r_a)\frac{(1+v)(1-2v)}{E(1-v)}$$

where $E_0$=the anomalous overburden strain, $dS_0$=the anomalous overburden stress, E=Young's modulus of a sediment, v=Poisson's ratio of the sediment, and $r_a$=location of a cell in the one or more topographic anomalies.

6. The method of claim 1 wherein (e) comprises determining the velocity correction factor using:

$$vint_{anom} = vint_{orig}\left[\left(1+\frac{S_{zz}}{S_0}\right)^{\frac{1}{n}}-1\right]$$

where $vint_{anom}$=interval velocity anomaly correction factor, $vint_{orig}$=original interval velocity, $S_0$=the overburden stress, $S_{zz}$=the sum over $S_z$ for all cells in the one or more topographic anomalies, and n=a constant describing a sensitivity of velocity to stress.

7. The method of claim 6 wherein n equals 3.

8. The method of claim 1 wherein the surface comprises a seafloor.

9. A computer system, comprising:
an interface for receiving a seismic input volume, the seismic input volume comprising a plurality of seismic traces;
a memory resource;
input and output functions for presenting and receiving communication signals to and from a human user;
one or more central processing units for executing program instructions; and program memory, coupled to the central processing unit, for storing a computer program including program instructions that, when executed by the one or more central processing units, cause the computer system to perform a plurality of operations for correcting a velocity model, the plurality of operations comprising:
(a) selecting a velocity model of a subsurface region of interest, the subsurface region of interest located proximate to a surface comprising one or more topographic anomalies;
(b) determining an anomalous overburden stress caused by the one or more topographic anomalies;
(c) determining an overburden strain caused by the one or more topographic anomalies;
(d) using a nucleus of strain theory to determine an anomalous stress propagation in the subsurface region of interest by calculating $$S_z(r_{a,i}) = -\frac{C_m}{R^3}$$

$S_z(r_{a,i}) = -C_m/R^3$ wherein $S_z(r_{a,i})$=anomalous stress at a particular subsurface location $r_i$ caused by cell "a" in the anomalous topography, R=distance between subsurface cell "i" and a cell "a" in the one or more topographic anomalies with $$C_m = \frac{2GV_a E_0(r_a)}{4\pi}$$

$C_m = 2GV_a E_0(r_a)/4\pi$ where G=shear modulus, $V_a$=volume of a cell in the one or more topographic anomalies, $E_0(r_a)$=anomalous overburden strain at location $r_a$;
(e) determining a velocity correction factor from the anomalous stress propagation; and
(f) using the velocity correction factor to generate a corrected velocity model.

10. The system of claim 9 wherein the one or more topographic anomalies comprises a seamount, a ridge, a canyon, a valley, or combinations thereof.

11. The system of claim 9 wherein (b) comprises determining the overburden stress using:

$$dS_0(z_i) = \sum_i (\rho_{flat} - \rho_{orig})g(z_i - z_{i-1})$$

where $dS_0$=the anomalous overburden stress, $\rho_{flat}$=the density without the one or more topographic anomalies, $\rho_{orig}$=original density, g=gravitational constant, and $z_i$=depth.

12. The system of claim 11 wherein the density is calculated using Gardner's equation.

13. The system of claim 9 wherein (c) comprises determining the overburden strain using:

$$E_0(r_a) = dS_0(r_a)\frac{(1+v)(1-2v)}{E(1-v)}$$

where $E_0$=the anomalous overburden strain, $dS_0$=the anomalous overburden stress, E=Young's modulus of a sediment, v=Poisson's ratio of the sediment, and $r_a$=location of a cell in the one or more topographic anomalies.

14. The system of claim 9 wherein (e) comprises determining the velocity correction factor using:

$$vint_{anom} = vint_{orig}\left[\left(1+\frac{S_{zz}}{S_0}\right)^{\frac{1}{n}}-1\right]$$

where $vint_{anom}$=interval velocity anomaly correction factor, $vint_{orig}$=original interval velocity, $S_0$=the overburden stress, $S_{zz}$=the sum over $S_z$ for all cells in the one or more topographic anomalies, and n=a constant describing a sensitivity of velocity to stress.

15. The system of claim 14 wherein n equals 3.

16. The system of claim 9 wherein the surface comprises a seafloor.

17. A computer-implemented method of correcting a velocity model, the method comprising:
(a) selecting a velocity model of a subsurface region of interest, the subsurface region of interest located proximate a surface comprising one or more topographic anomalies;
(b) using a nucleus of strain theory to determine a velocity correction factor for the one or more topographic anomalies by calculating $$S_z(r_{a,i}) = -\frac{C_m}{R^3}$$

$S_z(r_{a,i}) = -C_m/R^3$ wherein $S_z(r_{a,i})$=anomalous stress at a particular subsurface location $r_i$ caused by cell "a" in the anomalous topography, R=distance between subsurface cell "i" and a cell "a" in the one or more topographic anomalies with $$C_m = \frac{2GV_a E_0(r_a)}{4\pi}$$

$C_m = 2GV_a E_0(r_a)/4\pi$ where G=shear modulus, $V_a$=volume of a cell in the one or more topographic anomalies, $E_0(r_a)$=anomalous overburden strain at location $r_a$; and (c) using the velocity correction factor to generate a corrected velocity model, wherein at least one of (a) through (c) is performed on a computer.

18. The method of claim 17 wherein the surface comprises a seafloor.

\* \* \* \* \*